US00RE50974E

(19) United States
(12) Reissued Patent
Ye

(10) Patent Number: US RE50,974 E
(45) Date of Reissued Patent: Jul. 28, 2026

(54) BEAM FAILURE REPORTING

(71) Applicant: Google LLC, Mountain View, CA (US)

(72) Inventor: Shiang-Rung Ye, New Taipei City (TW)

(73) Assignee: Google LLC, Mountain View, CA (US)

(21) Appl. No.: 18/343,705

(22) Filed: Jun. 28, 2023

Related U.S. Patent Documents

Reissue of:
(64) Patent No.: 11,411,634
Issued: Aug. 9, 2022
Appl. No.: 17/051,381
PCT Filed: Jun. 15, 2019
PCT No.: PCT/US2019/037398
§ 371 (c)(1),
(2) Date: Oct. 28, 2020
PCT Pub. No.: WO2019/245930
PCT Pub. Date: Dec. 26, 2019

U.S. Applications:
(60) Provisional application No. 62/687,983, filed on Jun. 21, 2018.

(51) Int. Cl.
*H04W 80/02* (2009.01)
*H04B 7/06* (2006.01)
(Continued)

(52) U.S. Cl.
CPC ..... *H04W 80/02* (2013.01); *H04B 7/0695* (2013.01); *H04W 56/001* (2013.01);
(Continued)

(58) Field of Classification Search
CPC ... H04W 80/02; H04W 56/00; H04W 56/001; H04W 72/23; H04W 76/11; H04W 76/19; H04B 7/0695; H04B 7/06964
See application file for complete search history.

(56) References Cited

U.S. PATENT DOCUMENTS

2011/0207485 A1 8/2011 Dimou et al.
2017/0331577 A1 11/2017 Parkvall et al.
(Continued)

FOREIGN PATENT DOCUMENTS

CN 105191432 A 12/2015
CN 107079459 8/2017
(Continued)

OTHER PUBLICATIONS

Translation of CN109962756A (Year: 2019).*
(Continued)

*Primary Examiner* — Matthew E Heneghan
(74) *Attorney, Agent, or Firm* — Colby Nipper PLLC

(57) ABSTRACT

This document describes reporting beam failure by a user equipment (110) to a base station (121) in a radio access network (140), in which the user equipment (110) receives a first uplink grant (502) and initiates a beam recovery procedure (504). Based on the beam recovery procedure determining that a beam has failed, the user equipment (110) transmits, using the first uplink grant, a first Media Access Control Protocol Data Unit including a first MAC Control Element that indicates a first Synchronization Signal Block and a second Synchronization Signal Block, the transmission being effective to cause the base station (121) to determine that, based on receiving the first Synchronization Signal Block, the beam failure was detected by the user equipment (110) on the first Synchronization Signal Block (506).

21 Claims, 5 Drawing Sheets

(51) Int. Cl.

| | |
|---|---|
| ***H04W 56/00*** | (2009.01) |
| ***H04W 72/04*** | (2023.01) |
| ***H04W 72/14*** | (2009.01) |
| ***H04W 72/23*** | (2023.01) |
| ***H04W 76/11*** | (2018.01) |
| ***H04W 76/19*** | (2018.01) |

(52) U.S. Cl.
CPC ..... *H04W 72/23* (2023.01); *H04W 76/11* (2018.02); *H04W 76/19* (2018.02); *H04W 56/00* (2013.01)

(56) References Cited

U.S. PATENT DOCUMENTS

| | | | | |
|---|---|---|---|---|
| 2018/0006770 | A1* | 1/2018 | Guo | H04L 1/1822 |
| 2019/0215048 | A1* | 7/2019 | Cirik | H04W 74/0833 |
| 2019/0253986 | A1* | 8/2019 | Jeon | H04L 5/0048 |
| 2020/0322031 | A1* | 10/2020 | You | H04W 76/11 |

FOREIGN PATENT DOCUMENTS

| | | | | | |
|---|---|---|---|---|---|
| CN | 109962756 | A | * | 7/2019 | H04B 7/0617 |
| WO | 2017151876 | | | 9/2017 | |
| WO | 2017196612 | | | 11/2017 | |
| WO | 2017221202 | | | 12/2017 | |
| WO | 2018027904 | | | 2/2018 | |
| WO | 2018064483 | | | 4/2018 | |
| WO | 2018084642 | A1 | | 5/2018 | |
| WO | 2019063420 | | | 4/2019 | |
| WO | 2019245930 | | | 12/2019 | |

OTHER PUBLICATIONS

Provisional U.S. Appl. No. 62/615,275 (Year: 2018).*
Provisional U.S. Appl. No. 62/631,332 (Year: 2018).*
"Beam Recovery in NR", 3GPP TSG RAN WG1#88 R1-1703168 Athens, Greece,, Feb. 2017, 5 pages.
"Foreign Office Action", CN Application No. 201980005832.3, Jan. 9, 2023, 16 pages.
"Foreign Office Action", EP Application No. 19735454.1, Apr. 11, 2023, 6 pages.
"Foreign Office Action", EP Application No. 19735454.1, May 26, 2021, 6 pages.
"Identification of Contention based random access for beam failure recovery", 3GPP TSG-RAN WG2 #101-R2-1803045, Mar. 2018, 3 pages.
"International Preliminary Report on Patentability", Application No. PCT/US2019/037398, Dec. 30, 2020, 11 pages.
"International Search Report and Written Opinion", Application No. PCT/US2019/037398, Sep. 20, 2019, 18 pages.
"Issue of Beam Failure Recovery procedure on SCell", 3GPP TSG-RAN WG2 Meeting #102-R2-1806902, May 2018, 3 pages.
"Notice of Allowance", U.S. Appl. No. 17/051,381, filed Jan. 28, 2022, 8 pages.
"Notice of Allowance", U.S. Appl. No. 17/051,381, filed Mar. 16, 2022, 9 pages.
"RAN1 NR-Adhoc#3", Sep. 2017, 195 pages.
"Recovery Mechanisms for Beam Failure Scenarios", 3GPP Tsg Ran WG1 Meeting #88 R1-1702938 Athens, Greece, Feb. 2017, 3 pages.
"SCell Beam Failure Recovery", 3GPP TSG-RAN WG2 Meeting #101bis-R2-1805342, Apr. 2018, 3 pages.
"Work Plan for Rel-15 NR WI", 3GPP Tsg Ran WG1 Meeting #90bis, Prague, CZ, Oct. 2017, 174 pages.
"Foreign Office Action", EP Application No. 19735454.1, Mar. 10, 2025, 7 pages.
"Foreign Office Action", CN Application No. 202310885559.6, Feb. 4, 2026, 10 pages.
"Work plan for Rel-15 NR WI", 3GPP TSG Ran WG1 Meeting #90bis R1-1718177, Oct. 2017, 173 pages.

* cited by examiner

BEAM FAILURE REPORTING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of and claims priority to U.S. Non-Provisional Patent Application Ser. No. 17/051,381, filed on Oct. 28, 2020, which in turn is a National Stage Entry of and claims priority to International Patent Application Serial No. PCT/US2019/037398, filed on Jun. 15, 2019, which in turn claims priority to U.S. Provisional Patent Application Ser. No. 62/687,983, filed on Jun. 21, 2018, the disclosures of which are incorporated by reference herein in their entireties.*

BACKGROUND

The evolution of wireless communication to fifth generation (5G) standards and technologies provides higher data rates and greater capacity, with improved reliability and lower latency, which enhances mobile broadband services. 5G technologies also enables new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G systems. The 5G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase the capacity of 5G radio networks, Multiple Input Multiple Output (MIMO) antenna systems are used to beamform signals transmitted between base stations and user terminals. In 5G networks, a large number of MIMO antennas (e.g., hundreds of antennas) are employed for beamforming signals, which is often referred to as Massive MIMO, to provide beamformed transmission and reception that is focused on small areas of space around individual user terminals. Massive MIMO beamforming improves network throughput, energy efficiency, and interference rejection. Massive MIMO systems use a channel estimate of the radio frequency (RF) channel characteristics between the base station and the user terminal to determine beamforming coefficients for transmission and reception.

In Fifth Generation New Radio (5G NR) wireless communication systems, if the signal strength or signal quality of a serving downlink transmit beam to a user device (e.g., User Equipment or UE) has poor link quality, a lower layer (e.g., physical layer) in the network stack will send a beam failure instance indication to the Media Access Control (MAC) entity in the UE's network stack. The MAC entity will perform a beam failure detection/recovery procedure. When the beam failure happens, the MAC entity will initiate a random-access procedure. During the random-access procedure, the user equipment will select a downlink transmit beam and select one of the preambles that are associated with the downlink transmit beam. After the random-access procedure is successfully completed, a serving cell base station (e.g., gNB) determines that the user equipment has changed the downlink transmit beam.

The gNB may configure the UE with dedicated preambles or time-frequency resources for the downlink transmit beam. With these resources, the UE does not contend with other UEs to transmit a preamble. This type of random-access procedure is called contention-free random access. Otherwise, a UE has to perform a contention-based random-access procedure where it may take a longer time to complete the random-access procedure.

Because there are limited numbers of preambles and time-frequency resources, in most cases, a UE is not configured with dedicated preambles and time-frequency resources, so contention-based random access is used. Even when the UE is configured with dedicated preambles and time-frequency resources for a downlink transmit beam, the UE still needs to fall back to using the contention-based random-access procedure, if the signal strength or signal quality of the beam has poor link quality.

SUMMARY

This summary is provided to introduce simplified concepts of beam failure reporting. The simplified concepts are further described below in the Detailed Description. This summary is not intended to identify essential features of the claimed subject matter, nor is it intended for use in determining the scope of the claimed subject matter.

In aspects, methods, devices, and means for reporting a beam failure by a user equipment in a wireless communication network are described in which the user equipment receives a first uplink grant and initiates a beam recovery procedure. The user equipment, based on the beam recovery procedure determining that a beam has failed, transmits, using the first uplink grant, a first Media Access Control Protocol Data Unit including a first MAC Control Element that indicates a first Synchronization Signal Block and a second Synchronization Signal Block, the transmission being effective to cause the base station to determine that, based on receiving the first Synchronization Signal Block, the beam failure was detected by the user equipment on the first Synchronization Signal Block.

In other aspects, methods, devices, and means for managing a beam failure report from a user equipment by a base station in a wireless communication network are described in which the base station receives, from the user equipment, a first Media Access Control Protocol Data Unit including a first MAC Control Element that indicates a first Synchronization Signal Block and a second Synchronization Signal Block. The base station determines, based on receiving the first Synchronization Signal Block, that the user equipment detected a beam failure on the first Synchronization Signal Block, and the base station selects a first downlink transmit beam with a lighter traffic load among the beams that are associated with the Synchronization Signal Blocks indicated in the first MAC Control Element, the first downlink transmit beam being associated with a first Synchronization Signal Block.

BRIEF DESCRIPTION OF THE DRAWINGS

Aspects of beam failure reporting are described with reference to the following drawings. The same numbers are used throughout the drawings to reference like features and components.

DETAILED DESCRIPTION

Figure 1:
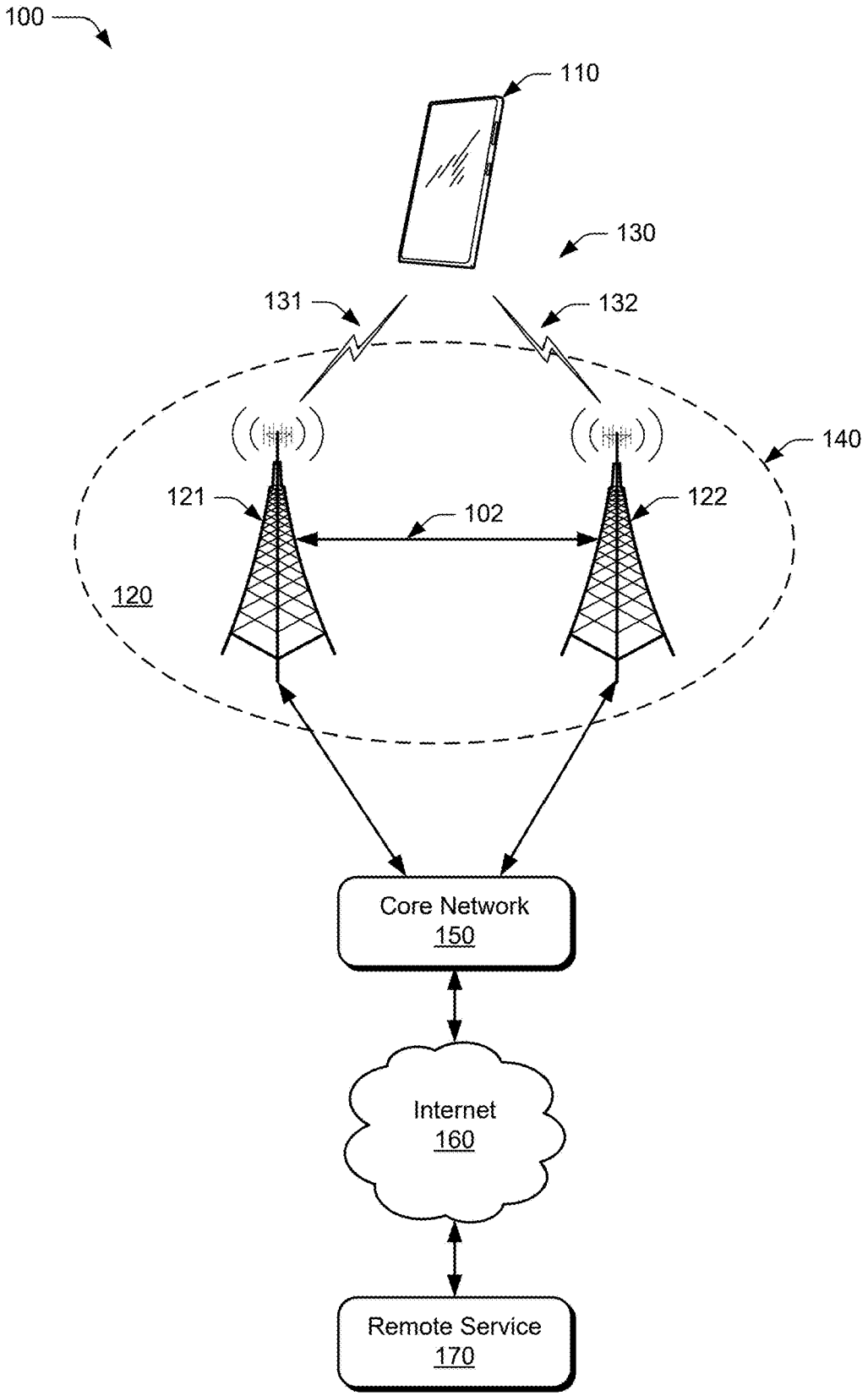
FIG. 1 illustrates an example wireless network environment in which various aspects of beam failure reporting can be implemented.

In Fifth Generation New Radio (5G NR) wireless communication systems, if the signal strength or signal quality of a serving-cell downlink transmit beam to a user device (e.g., User Equipment or UE) has poor link quality, a lower layer (e.g., physical layer) in the network stack will send a beam failure instance indication to the Media Access Control (MAC) entity in the UE's network stack. The MAC entity will perform a beam failure detection/recovery procedure. When the beam failure happens, the MAC entity will initiate a random-access procedure. During the random-access procedure, the user equipment will select a downlink transmit beam and select one of the preambles that are associated with the downlink transmit beam. After the random-access procedure is successfully completed, a serving cell base station (e.g., gNB) determines that the user equipment has changed the downlink transmit beam.

The base station may configure the user equipment with dedicated preambles or time-frequency resources for the downlink transmit beam. With these resources, the user equipment does not contend with other UEs to transmit a preamble. This type of random-access procedure is called contention-free random access. Otherwise, a user equipment has to perform a contention-based random-access procedure where it may take a longer time to complete the random-access procedure.

Since there are a limited number of preambles and time-frequency resources, in most cases, a user equipment is not configured with dedicated preambles and time-frequency resources, so contention-based random access is used. Even when the user equipment is configured with dedicated preambles and time-frequency resources for a downlink transmit beam, if the signal strength or signal quality of the beam has poor link quality, the user equipment still needs to fall back to using the contention-based random-access procedure.

In aspects, an approach to reporting a beam failure is described that reduces the amount of time required to perform the beam recovery procedure. The user equipment sends beam failure information to the base station using a configured grant. When a beam failure happens, the UE may not able to receive an uplink grant from the base station, so the user equipment may not be able to transmit beam failure information to the base station. However, if the user equipment has received a configured grant, the user equipment still can use the configured grant to transmit beam failure information to the network.

In an uplink, the base station can dynamically allocate resources to UEs via a Cell Radio Network Temporary Identifier (C-RNTI) on a Physical Downlink Control Channel (PDCCH). A user equipment monitors the PDCCH(s) in order to find possible grants for uplink transmission when its downlink reception is enabled which is activity governed by Discontinuous Reception (DRX) when DRX is configured. When Cell Allocation (CA) is configured, the same C-RNTI applies to all serving cells.

In addition, with configured grants, the base station can allocate uplink resources for initial Hybrid Automatic Repeat Request (HARQ) transmissions to UEs. Two types of configured uplink grants are defined:

- Type 1, in which, Radio Resource Control (RRC) directly provides the configured uplink grant (including periodicity), and
- Type 2, in which the RRC defines the periodicity of the configured uplink grant while the PDCCH addressed to Configured Scheduling Radio Network Temporary Identity (CS-RNTI) can either signal and activate the configured uplink grant, or deactivate it (e.g., a PDCCH addressed to the CS-RNTI indicates that the uplink grant can be implicitly reused according to the periodicity defined by RRC, until it is deactivated).

When a configured uplink grant is active, if the user equipment cannot find its C-RNTI or CS-RNTI on the PDCCH(s), the user equipment can make an uplink transmission according to the configured uplink grant. Otherwise, if the user equipment finds its C-RNTI or CS-RNTI on the PDCCH(s), the PDCCH allocation overrides the configured uplink grant. Retransmissions other than repetitions are explicitly allocated via PDCCH(s).

When CA is configured, at most one configured uplink grant can be signaled per serving cell. When Broadcast Control Channel (BCCH) Allocation (BA) is configured, at most one configured uplink grant can be signaled per Bandwidth Part (BWP). On each serving cell, there can be only one configured uplink grant active at a time. A configured uplink grant for one serving cell can either be of Type 1 or Type 2 as described previously. For Type 2, activation and deactivation of configured uplink grants are independent among the serving cells. When a Supplementary Uplink (SUL) is configured, the configured uplink grant can only be signaled for one of the two uplinks of the cell.

Example Environment

FIG. 1 illustrates an example environment 100 which includes a user equipment 110 (UE 110) that can communicate with base stations 120 (illustrated as base stations 121 and 122) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 102, to exchange user-plane and control-plane data. The user equipment 110 may connect, via the core network 150, to public networks, such as the Internet 160 to interact with a remote service 170.

Figure 2:
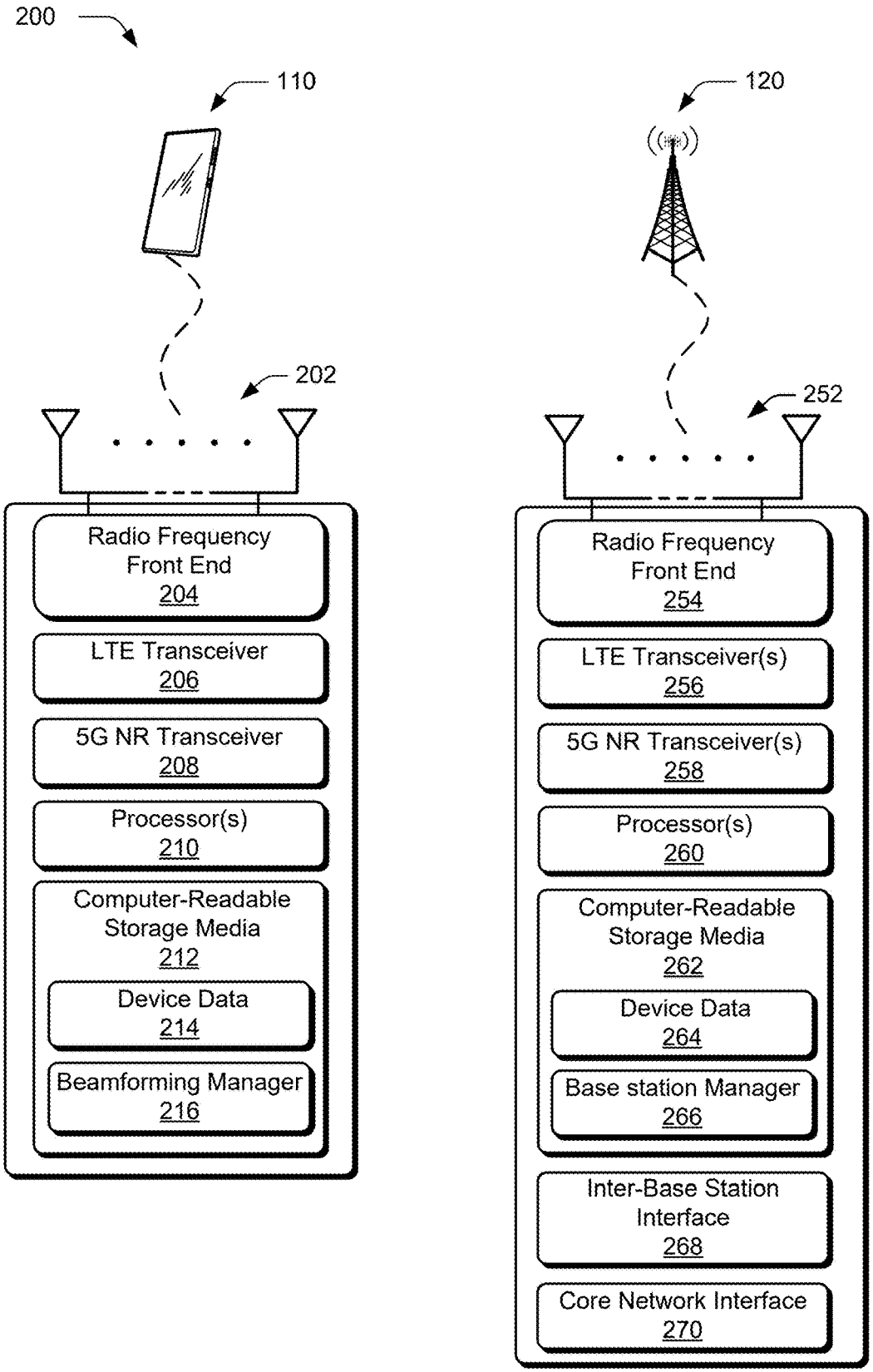
FIG. 2 illustrates an example device diagram that can implement various aspects of beam failure reporting.

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, and a 5GNR transceiver 208 for communicating with base stations 120 in the RAN 140. The RF front end 204 of the user equipment 110 can couple or connect the LTE transceiver 206, and the 5GNR transceiver 208 to the antennas 202 to facilitate various types of wireless communication. The antennas 202 of the user equipment 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5GNR transceiver 208. Additionally, the antennas 202, the RF front end 204, the LTE transceiver 206, and/or the 5GNR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The user equipment 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the user equipment 110. The device data 214 includes user data, multimedia data, beamforming codebooks, applications, and/or an operating system of the user equipment 110, which are executable by processor(s) 210 to enable user-plane communication, control-plane signaling, and user interaction with the user equipment 110.

In some implementations, the CRM 212 may also include a beamforming manager 216. Alternately or additionally, the beamforming manager 216 may be implemented in whole or part as hardware logic or circuitry integrated with or separate from other components of the user equipment 110. The beamforming manager 216 can communicate with the antennas 202, the RF front end 204, the LTE transceiver 206, and/or the 5G NR transceiver 208 to implement techniques for cross-carrier hybrid automatic repeat request described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the user equipment 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the user equipment 110, as well as communication with a core network, such as the core network 150.

The base stations 120 include an inter-base station interface 268, such as an Xn and/or X2 interface, which the base station manager 266 configures to exchange user-plane and control-plane data between other base stations 120, to manage the communication of the base stations 120 with the user equipment 110. The base stations 120 include a core network interface 270 that the base station manager 266 configures to exchange user-plane and control-plane data with core network functions and/or entities.

User Plane and Control Plane Signaling

Figure 3:
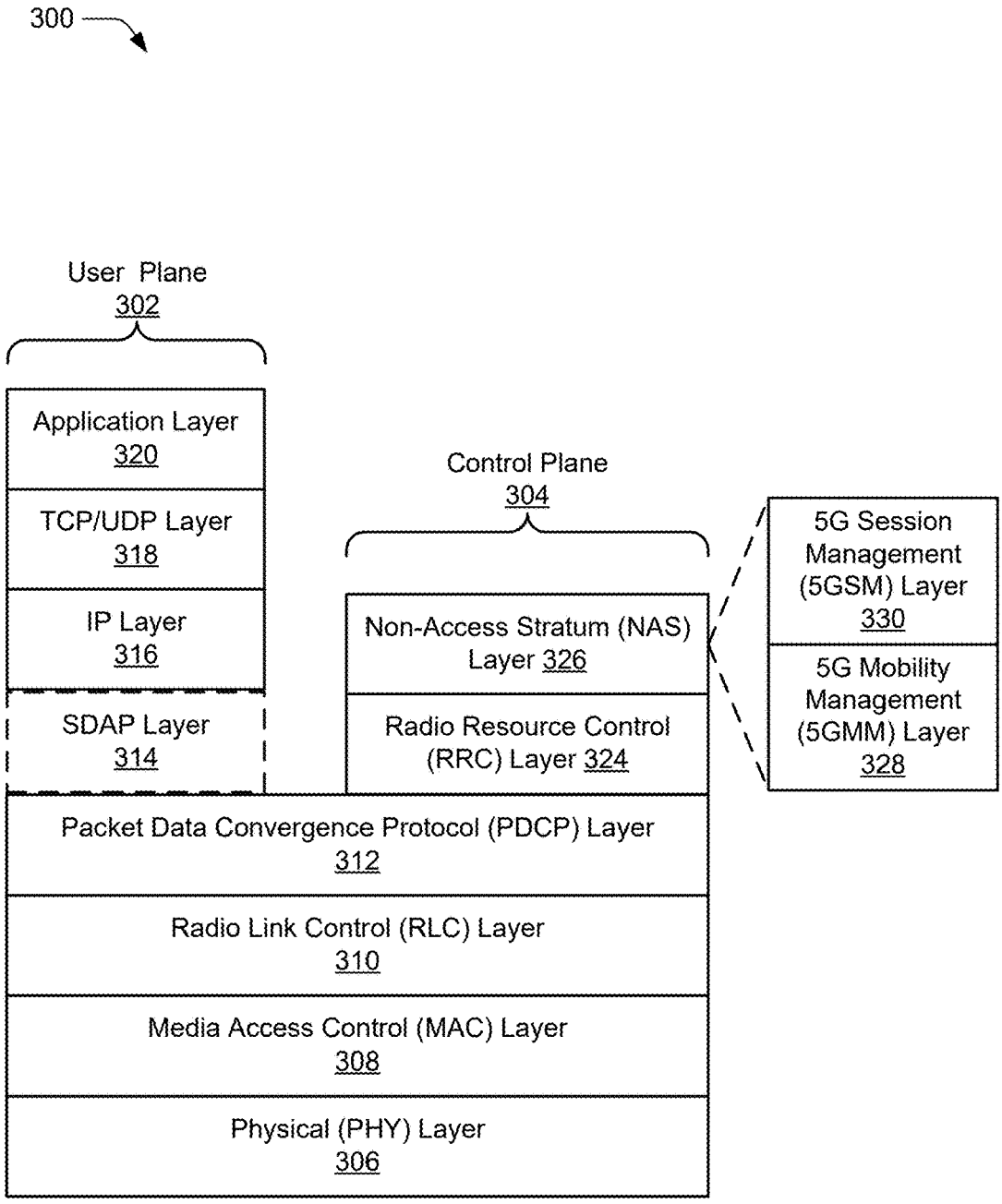
FIG. 3 illustrates an example block diagram of a network stack model with which various aspects of beam failure reporting techniques can be implemented.

FIG. 3 illustrates an example block diagram 300 of a wireless network stack model 300 (stack 300). The stack 300 characterizes a communication system for the example environment 100, in which various aspects of beam failure reporting can be implemented. The stack 300 includes a user plane 302 and a control plane 304. Upper layers of the user plane 302 and the control plane 304 share common lower layers in the stack 300. Wireless devices, such as the UE 110 or the base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical (PHY) layer 306, a Media Access Control (MAC) layer 308, a Radio Link Control (RLC) layer 310, and a PDCP layer 312. The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack splits into the user-plane 302 and the control-plane 304. Layers of the user plane 302 include an optional Service Data Adaptation Protocol (SDAP) layer 314, an Internet Protocol (IP) layer 316, a Transmission Control Protocol/User Datagram Protocol (TCP/UDP) layer 318, and an application layer 320, which transfers data using the wireless link 131. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application layer 320. In some implementations, the user plane 302 may also include a data services layer (not shown) that provides data transport services to transport application data, such as IP packets including web browsing content, video content, image content, audio content, or social media content.

The control plane 304 includes a Radio Resource Control (RRC) layer 324 and a Non-Access Stratum (NAS) layer 326. The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected state (e.g., an RRC connected state) or a disconnected state, such as an inactive state (e.g., an RRC inactive state) or an idle state (e.g., an RRC idle state). In general, if the UE 110 is in the connected state, the connection with the base station 120 is active. In the inactive state, the connection with the base station 120 is suspended. If the UE 110 is in the idle state, the connection with the base station 120 is released. Generally, the RRC layer 324 supports 3GPP access but does not support non-3GPP access (e.g., WLAN communications).

The NAS layer 326 provides support for mobility management (e.g., using a Fifth-Generation Mobility Management (SGMM) layer 328) and packet data bearer contexts (e.g., using a Fifth-Generation Session Management (SGSM) layer 330) between the UE 110 and entities or functions in the core network, such as an Access and Mobility Management Function (AMF) of the core network 150 or the like. The NAS layer 326 supports both 3GPP access and non-3GPP access.

In the UE 110, each layer in both the user plane 302 and the control plane 304 of the stack 300 interacts with a corresponding peer layer or entity in the base station 120, a core network entity or function, and/or a remote service, to support user applications and control operation of the UE 110 in the RAN 140.

Figure 4:
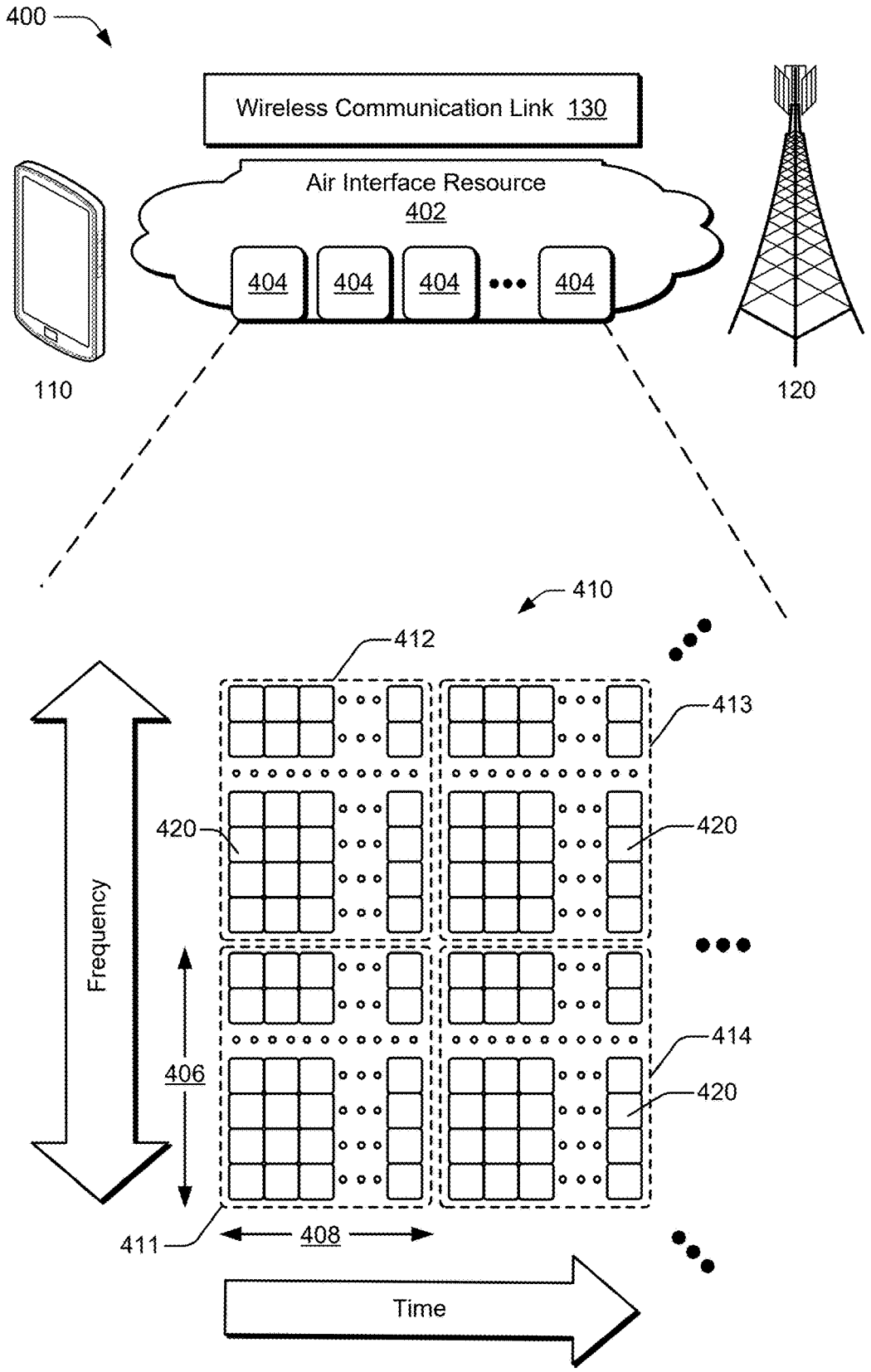
FIG. 4 illustrates an air interface resource that extends between a user equipment and a base station and with which various aspects of beam failure reporting techniques can be implemented.

FIG. 4 illustrates an air interface resource that extends between a user equipment and a base station and with which various aspects of beam failure reporting can be implemented. The air interface resource 402 can be divided into resource units 404, each of which occupies some intersection of frequency spectrum and elapsed time. A portion of the air interface resource 402 is illustrated graphically in a grid or matrix having multiple resource blocks 410, including resource blocks 411, 412, 413, 414. An example of a resource unit 404 therefore includes at least one resource block 410. As shown, time is depicted along the horizontal dimension as the abscissa axis, and frequency is depicted along the vertical dimension as the ordinate axis. The air interface resource 402, as defined by a given communication protocol or standard, may span any suitable specified frequency range and/or may be divided into intervals of any specified duration. Increments of time can correspond to, for example, milliseconds (mSec). Increments of frequency can correspond to, for example, megahertz (MHz).

In example operations generally, the base station 121 allocates portions (e.g., resource units 404) of the air interface resource 402 for uplink and downlink communications. Each resource block 410 of network access resources may be allocated to support respective wireless communication link 131 of multiple user equipment 110. In the lower left corner of the grid, the resource block 411 may span, as defined by a given communication protocol, a specified frequency range 406 and comprise multiple subcarriers or frequency sub-bands. The resource block 411 may include any suitable number of subcarriers (e.g., 12) that each correspond to a respective portion (e.g., 15 kHz) of the specified frequency range 406 (e.g., 180 kHz). The resource block 411 may also span, as defined by the given communication protocol, a specified time interval 408 or time slot (e.g., lasting approximately one-half millisecond or 7 orthogonal frequency-division multiplexing (OFDM) symbols). The time interval 408 includes subintervals that may each correspond to a symbol, such as an OFDM symbol. As shown in FIG. 4, each resource block 410 may include multiple resource elements 420 (REs) that correspond to, or are defined by, a subcarrier of the frequency range 406 and a subinterval (or symbol) of the time interval 408. Alternatively, a given resource element 420 may span more than one frequency subcarrier or symbol. Thus, a resource unit 404 may include at least one resource block 410, at least one resource element 420, and so forth.

In example implementations, multiple user equipment 110 (one of which is shown) are communicating with the base station 121 through access provided by portions of the air interface resource 402. The base station manager 266 (not shown in FIG. 4) may determine a respective type or amount of information (e.g., data or control information) to be communicated (e.g., transmitted) by the user equipment 110. For example, the base station manager 266 can determine that each user equipment 110 is to transmit a different respective amount of information. The base station manager 266 then allocates one or more resource blocks 410 to each user equipment 110 based on the determined amount of information.

Additionally or in the alternative to block-level resource grants, the base station manager 266 may allocate resource units at an element-level. Thus, the base station manager 266 may allocate one or more resource elements 420 or individual subcarriers to different user equipment 110. By so doing, one resource block 410 can be allocated to facilitate network access for multiple user equipment 110. Accordingly, the base station manager 266 may allocate, at various granularities, one or up to all subcarriers or resource elements 420 of a resource block 410 to one user equipment 110 or divided across multiple user equipment 110, thereby enabling higher network utilization or increased spectrum efficiency.

The base station manager 266 can therefore allocate air interface resource 402 by resource unit 404, resource block 410, frequency carrier, time interval, resource element 420, frequency subcarrier, time subinterval, symbol, spreading code, some combination thereof, and so forth. Based on respective allocations of resource units 404, the resource manager can transmit respective messages to the multiple user equipment 110 indicating the respective allocation of resource units 404 to each user equipment 110. Each message may enable a respective user equipment 110 to queue the information or configure the LTE transceiver 206, the 5G NR transceiver 208, or both to communicate via the allocated resource units 404 of the air interface resource 402.

Beam Failure Reporting

In aspects, if a user equipment 110 has initiated a beam recovery procedure and has not completed the procedure, the user equipment 110 transmits, to the base station 121, a first MAC Protocol Data Unit (PDU) including a first MAC Control element (CE) on a first uplink grant. In another aspect, the first MAC CE is associated with a first Logical Channel Identifier (LCID), and the first LCID is used to identify the first MAC CE.

In another aspect, the first MAC CE is associated with a first MAC subheader in the first MAC PDU. The first MAC subheader includes an LCID field that includes the value of the first LCID. The base station 121 parses the first MAC PDU. If the base station 121 detects a MAC subheader where the LCID field includes the first LCID, the base station 121 determines that this MAC subheader is the first MAC subheader, and the base station 121 expects the first MAC CE will follow the first MAC subheader.

In another aspect, the first MAC CE comprises a first field that indicates one or more Synchronization Signal Blocks (SSBs). Each SSB is associated with a downlink transmit beam. The first field is a bitmap in which each bit of the bitmap is associated with an SSB. If the value of a bit is set to a first value, the user equipment 110 selects the SSB associated with the bit. If the value of the bit is set to a second value, the user equipment 110 does not select the SSB associated with the bit.

In a further aspect, the first field comprises of one or more SSB ID subfields. If an SSB is selected by the user equipment 110, the SSB ID of the SSB is provided in one of SSB ID subfields. For example, the user equipment 110 selects an SSB if the Reference Signal Received Quality (RSRP) of the Synchronization Symbol (SS) block, (e.g., SS-RSRP) is above a threshold (e.g., rsrp-ThresholdSSB defined as in 3GPP TS 38.321 MAC). In another example, the user equipment selects an SSB if the Channel State Information (CSI) Reference Signals (RSs) of the SSB are above a threshold (e.g., rsrp-ThresholdCSI-RS defined in 3GPP TS 38.321 MAC).

In aspects, the first uplink grant is a Type 1 configured grant. The base station 121 sends a configuration of the Type 1 configured grant to the user equipment 110. The configuration includes an uplink grant. Once the user equipment 110 completes the configuration, the user equipment 110 can use the configured grant to transmit uplink data.

In another aspect, the first uplink grant is a Type 2 configured grant. The base station 121 sends a configuration of the Type 2 configured grant. Then the base station 121 sends the user equipment 110 Downlink Control Information (e.g., (DCI) on a Physical Downlink Control Channel (PDCCH) that is addressed to a Configured Scheduling Radio Network Temporary Identity (CS-RNTI) of the user equipment 110. Then the user equipment 110 can use the configured grant to transmit uplink data. The CS-RNTI is given in the configuration of Type 2 configured grant. Alternatively, the first uplink grant can also be a grant given in a DCI on PDCCH addressed to CS-RNTI.

In another aspect, based on receiving the first MAC PDU, the base station 121 determines that the user equipment 110 has detected a beam failure problem and that the user equipment 110 is requesting to change the downlink transmit beam to one of the beams associated with the SSBs indicated in the first MAC CE. The base station 121 either randomly selects or selects a first downlink transmit beam with lighter traffic load from among the beams that are associated with the SSBs indicated in the first MAC CE. The first downlink transmit beam is associated with a first SSB.

In a further aspect, a second MAC PDU comprises a second MAC CE that includes a bitmap or an SSB ID field. In the bitmap, the base station 121 sets the bit associated the first SSB to the first value. Alternatively, the base station 121 provides the SSB ID of the first SSB in the SSB ID field.

In a further aspect, the second MAC CE is associated with a second LCID. The LCID is used to identify the second MAC CE. The second MAC CE is associated with a second MAC subheader. The second MAC subheader includes an LCID field that includes the value of the second LCID. In this way, when the user equipment 110 detects a MAC subheader with the LCID field including the second LCID, the user equipment 110 determines that the MAC subheader is the second MAC subheader, and the user equipment 110 expects that the second MAC CE follows the second MAC subheader.

In a further aspect, the base station 121 transmits the second MAC PDU on the first downlink transmit beam. Alternatively, the base station 121 transmits the second MAC PDU on every downlink transmit beam that is associated with the SSBs indicated in the first MAC CE.

If the user equipment 110 receives the second MAC CE, it considers that the beam recovery procedure is completed. However, if a random-access procedure triggered due to beam recovery is still running, the user equipment 110 aborts the random-access procedure, or the user equipment 110 starts to detect a beam failure for the first SSB.

Example Method

Example method 500 is described with reference to FIG. 5 in accordance with one or more aspects of beam failure reporting. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
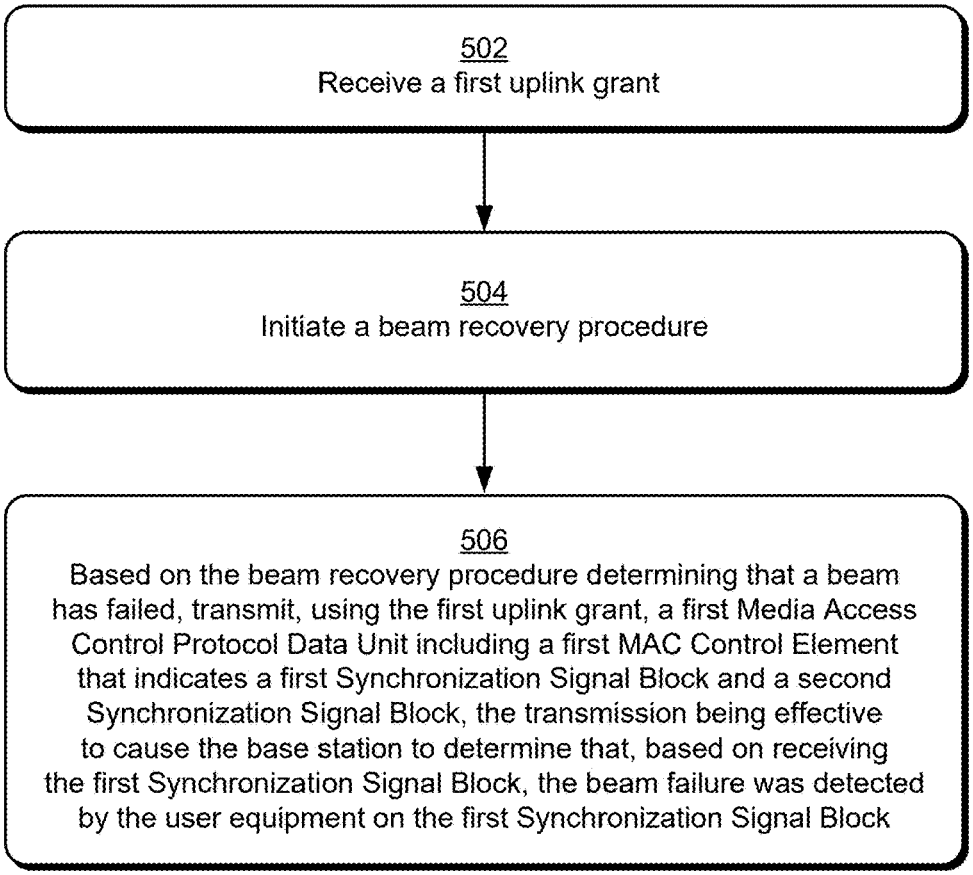
FIG. 5 illustrates an example method of beam failure reporting in accordance with aspects of the techniques described herein.

FIG. 5 illustrates example method(s) 500 of beam failure reporting. The order in which the method blocks are described are not intended to be construed as a limitation, and any number of the described method blocks can be combined or skipped in any order to implement a method or an alternate method.

At block 502, a user equipment (e.g., the user equipment 110) receives a first uplink grant. At block 504, the user equipment initiates a beam recovery procedure.

At block 506, based on the beam recovery procedure determining that a beam has failed, the user equipment transmits, using the first uplink grant, a first Media Access Control Protocol Data Unit including a first MAC Control Element that indicates a first Synchronization Signal Block and a second Synchronization Signal Block. The transmission causes the base station (e.g., the base station 121) to determine that, based on receiving the first Synchronization Signal Block, the beam failure was detected by the user equipment on the first Synchronization Signal Block.

In the following some examples are described:

Example 1: A method (500) of reporting a beam failure to a base station (120) by a user equipment (110) in a wireless communication network, the method comprising:

receiving (502), by the user equipment, a first uplink grant;

initiating (504), by the user equipment, a beam recovery procedure; and based on the beam recovery procedure determining that a beam has failed, transmitting (506), using the first uplink grant, a first Media Access Control Protocol Data Unit including a first MAC Control Element that indicates a first Synchronization Signal Block and a second Synchronization Signal Block, the transmitting being effective to cause the base station to determine that, based on receiving the first Synchronization Signal Block, the beam failure was detected by the user equipment on the first Synchronization Signal Block.

Example 2: The method of example 1, wherein the first MAC Control Element is associated with a first Logical Channel Identifier, and wherein the first Logical Channel Identifier is usable to identify the first MAC Control Element.

Example 3: The method of example 2, wherein the first MAC Control Element is associated with a first MAC subheader in the first Media Access Control Protocol Data Unit, wherein the first MAC subheader has a Logical Channel Identifier field whose value is the first Logical Channel Identifier, and wherein the first MAC subheader precedes the first MAC Control Element in the Media Access Control Protocol Data Unit.

Example 4: The method of any preceding example, wherein the first MAC Control Element contains a first field that indicates one or more Synchronization Signal Blocks, each Synchronization Signal Block being associated with a downlink transmit beam.

Example 5: The method of example 4, wherein the first field is a bitmap, wherein each bit of the bitmap is associated with a Synchronization Signal Block, the method further comprising:

selecting, by the user equipment, the Synchronization Signal Block associated with the bit if the value of the bit is set to a first value; or not selecting the Synchronization Signal Block associated with the bit if the value of the bit is set to a second value.

Example 6: The method of example 4 or example 5, wherein the first field consists of one or more Synchronization Signal Block Identifier subfields, wherein if the user equipment selects a Synchronization Signal Block, the Synchronization Signal Block Identifier of the Synchronization Signal Block is provided in one of Synchronization Signal Block Identifier subfields.

Example 7: The method of example 5 or example 6, the method further comprising:

selecting, by the user equipment, the Synchronization Signal Block if a Reference Signal Received Quality of the Synchronization Signal Block of the Synchronization Signal Block is above a threshold.

Example 8: The method of example 3, the method further comprising:

selecting, by the user equipment, a Synchronization Signal Block if Channel State Information Reference Signals of the Synchronization Signal Block are above a threshold.

Example 9: The method of any preceding example, wherein the first uplink grant is a type-1 configured grant, the method further comprising:

receiving, by the user equipment, a configuration of the type-1 configured grant, the configuration including an uplink grant; and transmitting uplink data using the configuration.

Example 10: The method of any of examples 1 to 8, wherein the first uplink grant is a type-2 configured grant, the method further comprising:

receiving by the user equipment, a configuration of type-2 configured grant;

receiving a Downlink Control Information on a Physical Downlink Control Channel addressed to Configured Scheduling Radio Network Temporary Identity of the user equipment; and transmitting uplink data using the configured grant, wherein the configuration of type-2 configured grant includes the Configured Scheduling Radio Network Temporary Identity.

Example 11: The method of any preceding example, wherein the first uplink grant is a grant given in a Downlink Control Information on Physical Downlink Control Channel addressed to Configured Scheduling Radio Network Temporary Identity.

Example 12: The method of any preceding example, further comprising:

based on receiving a second MAC Control Element, determining, by the user equipment that the beam recovery procedure is completed.

Example 13: The method of example 12, wherein a random-access procedure, which was triggered due to the beam recovery procedure, is still running, the method further comprising:

aborting, by the user equipment, the random-access procedure.

Example 14: A user equipment (110) comprising:

a wireless transceiver (202);

a processor (210); and memory (212) comprising instructions executable by the processor to perform any one of the methods of examples 1 to 13.

Example 15: A method of managing a beam failure report from a user equipment (110) by a base station (120) in a wireless communication network, the method comprising:

receiving, by the base station, a first Media Access Control Protocol Data Unit including a first MAC Control Element that indicates a first Synchronization Signal Block and a second Synchronization Signal Block;

determining, based on receiving the first Synchronization Signal Block, that the user equipment detected a beam failure on the first Synchronization Signal Block; and selecting a first downlink transmit beam with a lighter traffic load among beams that are associated with the Synchronization Signal Blocks indicated in the first MAC Control Element, the first downlink transmit beam being associated with the first Synchronization Signal Block.

Example 16: The method of example 15, wherein the base station randomly selects the first downlink transmit beam.

Example 17: The method of example 15 or example 16, wherein a second Media Access Control Protocol Data Unit includes a second MAC Control Element that includes a bitmap, the method further comprising:

setting, by the base station, a bit associated with the first Synchronization Signal Block to a first value in the bitmap.

Example 18: The method of any of examples 15 to 17, wherein a second Media Access Control Protocol Data Unit includes a second MAC Control Element that includes a Synchronization Signal Block Identifier field, the method further comprising:

providing, by the base station, the Synchronization Signal Block Identifier of the first Synchronization Signal Block in the Synchronization Signal Block Identifier field.

Example 19: The method of example 17 to example 18, wherein the second MAC Control Element is associated with a second Logical Channel Identifier, the Logical Channel Identifier being usable to identify the second MAC Control Element.

Example 20: The method of example 19, wherein the second MAC Control Element is associated with a second MAC subheader in the second Media Access Control Protocol Data Unit, wherein the second MAC subheader has a Logical Channel Identifier field whose value is the second Logical Channel Identifier, and wherein the second MAC subheader precedes the second MAC Control Element in the second Media Access Control Protocol Data Unit.

Example 21: The method of any of examples 17 to 20, further comprising:

transmitting, by the base station, the second Media Access Control Protocol Data Unit on the first downlink transmit beam.

Example 22: The method of any of examples 17 to 21, further comprising:

transmitting, by the base station, the second Media Access Control Protocol Data Unit on every downlink transmit beam that is associated with the Synchronization Signal Blocks indicated in the first MAC Control Element.

Example 23: A base station (120) comprising:

a wireless transceiver (252);

a processor (260); and memory (262) comprising instructions executable by the processor to perform any one of the methods of examples 15 to 22.

Although aspects of beam failure reporting have been described in language specific to features and/or methods, the subject of the appended claims is not necessarily limited to the specific features or methods described. Rather, the specific features and methods are disclosed as example implementations of beam failure reporting, and other equivalent features and methods are intended to be within the scope of the appended claims. Further, various different aspects are described, and it is to be appreciated that each described aspect can be implemented independently or in connection with one or more other described aspects.

The invention claimed is:

1. A method of reporting a beam failure to a base station by a user equipment in a wireless communication network, the method comprising:

receiving, by the user equipment, a first uplink grant;

initiating, by the user equipment, a beam recovery procedure; and based on the beam recovery procedure determining that a beam has failed, transmitting, to a base station using the first uplink grant, a first Media Access Control Protocol Data Unit including a first MAC Control Element that indicates one or more Synchronization Signal Blocks (SSBs) to indicate [based on receiving the MAC Control Element,] that the user equipment is requesting to change from the beam that has failed to a downlink transmit beam associated with one of the one or more SSBs indicated in the MAC Control Element.

2. The method of claim 1, wherein the first MAC Control Element is associated with a first Logical Channel Identifier, and wherein the first Logical Channel Identifier is usable to identify the first MAC Control Element.

3. The method of claim 2, wherein the first MAC Control Element is associated with a first MAC subheader in the first Media Access Control Protocol Data Unit, wherein the first MAC subheader has a Logical Channel Identifier field whose value is the first Logical Channel Identifier, and wherein the first MAC subheader precedes the first MAC Control Element in the Media Access Control Protocol Data Unit.

4. The method of claim 1, wherein the first MAC Control Element contains a first field that indicates one or more Synchronization Signal Blocks, each Synchronization Signal Block being associated with a downlink transmit beam.

5. The method of claim 4, wherein the first field is a bitmap, wherein each bit of the bitmap is associated with a Synchronization Signal Block, the method further comprising:

selecting, by the user equipment, the Synchronization Signal Block associated with the bit if the value of the bit is set to a first value; or not selecting the Synchronization Signal Block associated with the bit if the value of the bit is set to a second value.

6. The method of claim 4, wherein the first field consists of one or more Synchronization Signal Block Identifier subfields, wherein if the user equipment selects a Synchronization Signal Block, the Synchronization Signal Block Identifier of the Synchronization Signal Block is provided in one of Synchronization Signal Block Identifier subfields.

[7. The method of claim 5, the method further comprising:

selecting, by the user equipment, the Synchronization Signal Block if a Reference Signal Received Quality of the Synchronization Signal Block of the Synchronization Signal Block is above a threshold.]

[8. The method of claim 3, the method further comprising:

selecting, by the user equipment, a Synchronization Signal Block if Channel State Information Reference Signals of the Synchronization Signal Block are above a threshold.]

9. The method of claim 1, wherein the first uplink grant is a type-1 configured grant, the method further comprising:

receiving, by the user equipment, a configuration of the type-1 configured grant, the configuration including [an] *the first* uplink grant; and transmitting uplink data using the configuration.

10. The method of any of claim 1, wherein the first uplink grant is a type-2 configured grant, the method further comprising:

receiving by the user equipment, a configuration of type-2 configured grant;

receiving a Downlink Control Information on a Physical Downlink Control Channel addressed to Configured Scheduling Radio Network Temporary Identity of the user equipment; and transmitting uplink data using the configured grant, wherein the configuration of type-2 configured grant includes the Configured Scheduling Radio Network Temporary Identity.

11. The method of claim 1, wherein the first uplink grant is a grant given in a Downlink Control Information on Physical Downlink Control Channel addressed to Configured Scheduling Radio Network Temporary Identity.

12. The method of claim 1, further comprising:

based on receiving a second MAC Control Element, determining, by the user equipment that the beam recovery procedure is completed.

13. The method of claim 12, wherein a random-access procedure, which was triggered due to the beam recovery procedure, is still running, the method further comprising:

aborting, by the user equipment, the random-access procedure.

14. A user equipment comprising:

a wireless transceiver;

a processor; and memory comprising instructions executable by the processor to:

receive a first uplink grant;

initiate a beam recovery procedure; and based on the beam recovery procedure determining that a beam has failed, to a base station using the first uplink grant, a first Media Access Control Protocol Data Unit including a first MAC Control Element that indicates one or more Synchronization Signal Blocks (SSBs) to indicate [based on receiving the MAC Control Element,] that the user equipment is requesting to change from the beam that has failed to a downlink transmit beam associated with one of the one or more SSBs indicated in the MAC Control Element.

15. A method of managing a beam failure report from a user equipment by a base station in a wireless communication network, the method comprising:

receiving, by the base station, a first Media Access Control Protocol Data Unit including a first MAC Control Element that indicates [one] *two* or more Synchronization Signal Blocks [and a second Synchronization Signal Blocks];

determining, based on receiving the first MAC Control Element, that the user equipment detected a beam failure; and selecting a first downlink transmit beam [with a lighter traffic load among beams that are] associated with *one of* the [one] *two* or more Synchronization Signal Blocks indicated in the first MAC Control Element.

16. The method of claim 15, wherein the base station randomly selects the first downlink transmit beam.

17. The method of claim 15, wherein a second Media Access Control Protocol Data Unit includes a second MAC Control Element that includes a bitmap, the method further comprising:

setting, by the base station, a bit associated with [the] *a* Synchronization Signal Block associated with the selected first downlink transmit beam to a first value in the bitmap.

18. The method of any of claim 15, wherein a second Media Access Control Protocol Data Unit includes a second MAC Control Element that includes a Synchronization Signal Block Identifier field, the method further comprising:

providing, by the base station, the Synchronization Signal Block Identifier of [the] *a* Synchronization Signal Block associated with the selected first downlink transmit beam in the Synchronization Signal Block Identifier field.

19. The method of claim 17, wherein the second MAC Control Element is associated with a second Logical Channel Identifier, the Logical Channel Identifier being usable to identify the second MAC Control Element.

20. The method of claim 19, wherein the second MAC Control Element is associated with a second MAC subheader in the second Media Access Control Protocol Data Unit, wherein the second MAC subheader has a Logical Channel Identifier field whose value is the second Logical Channel Identifier, and wherein the second MAC subheader precedes the second MAC Control Element in the second Media Access Control Protocol Data Unit.

21. The method of claim 17, further comprising:

transmitting, by the base station, the second Media Access Control Protocol Data Unit on the first downlink transmit beam.

22. The method of claim 17, further comprising:

transmitting, by the base station, the second Media Access Control Protocol Data Unit on every downlink transmit beam that is associated with the [one] *two* or more Synchronization Signal Blocks indicated in the first MAC Control Element.

23. A base station comprising:

a wireless transceiver;

a processor; and memory comprising instructions executable by the processor to:

receive a first Media Access Control Protocol Data Unit including a first MAC Control Element that indicates [one] *two* or more Synchronization Signal Blocks;

determine, based on the received the first MAC Control Element, that a user equipment detected a beam failure; and select a first downlink transmit beam [with a lighter traffic load among beams that are] associated with *one of* the [one] *two* or more Synchronization Signal Blocks indicated in the first MAC Control Element.

* * * * *